(12) United States Patent
Zhang et al.

(10) Patent No.: US 9,473,967 B2
(45) Date of Patent: Oct. 18, 2016

(54) METHOD AND APPARATUS FOR PHYSICAL LAYER MEASUREMENTS IN MULTICAST BROADCAST MULTIMEDIA SERVICE SYSTEMS

(71) Applicant: QUALCOMM Incorporated, San Diego, CA (US)

(72) Inventors: Xiaoxia Zhang, San Diego, CA (US); Jun Wang, San Diego, CA (US); Gordon Kent Walker, Poway, CA (US); Peter Gaal, San Diego, CA (US); Ralph Akram Gholmieh, San Diego, CA (US); Daphna Zeilingold, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 604 days.

(21) Appl. No.: 13/677,156

(22) Filed: Nov. 14, 2012

(65) Prior Publication Data

US 2013/0128756 A1 May 23, 2013

Related U.S. Application Data

(60) Provisional application No. 61/561,201, filed on Nov. 17, 2011.

(51) Int. Cl.
*H04W 4/06* (2009.01)
*H04W 24/10* (2009.01)
(52) U.S. Cl.
CPC ............... *H04W 24/10* (2013.01); *H04W 4/06* (2013.01)
(58) Field of Classification Search
USPC ............................ 370/332, 252; 455/422.1
See application file for complete search history.

(56) References Cited

U.S. PATENT DOCUMENTS

2010/0309836 A1* 12/2010 Sugawara et al. ............ 370/312
2010/0311421 A1  12/2010 Mach
(Continued)

FOREIGN PATENT DOCUMENTS

JP  2010525759 A  7/2010
WO  2008134473 A2  11/2008
(Continued)

OTHER PUBLICATIONS

International Search Report and Written Opinion—PCT/US2012/065222—ISA/EPO—Mar. 6, 2013.
(Continued)

*Primary Examiner* — Andrew Lai
*Assistant Examiner* — Jamaal Henson
(74) *Attorney, Agent, or Firm* — Arent Fox LLP

(57) ABSTRACT

A method, an apparatus, and a computer program product for wireless communication are provided. An apparatus, e.g., user equipment (UE), receives a reporting requirement for one or more Multicast-Broadcast Single Frequency Network (MBSFN) physical layer parameters. The UE obtains the one or more MBSFN physical layer parameters including at least one parameter corresponding to a reference signal, and creates a report based on the obtained one or more MBSFN physical layer parameters. The UE may obtain the one or more MBSFN physical layer parameters using user-plane or control-plane based mechanisms. The user-plane mechanism involves the use of a modified version of the reporting mechanism for Quality of Experience (QoE) metrics. The control-plane mechanism involves the use of a modified version of the reporting mechanism for the Minimization of Drive Tests (MDT) metrics.

48 Claims, 13 Drawing Sheets

(56) References Cited

U.S. PATENT DOCUMENTS

| | | | |
|---|---|---|---|
| 2011/0256833 | A1 | 10/2011 | Racz et al. |
| 2011/0276617 | A1* | 11/2011 | Oksanen ............... H04H 60/13 709/201 |
| 2011/0306305 | A1* | 12/2011 | Huang ................ H04L 41/5009 455/67.11 |
| 2012/0026929 | A1 | 2/2012 | Wang et al. |
| 2012/0044910 | A1* | 2/2012 | Maeda ................. H04L 5/0005 370/332 |
| 2012/0106386 | A1* | 5/2012 | Johansson ............ H04W 24/10 370/252 |
| 2012/0163274 | A1 | 6/2012 | Yun et al. |
| 2012/0236776 | A1 | 9/2012 | Zhang et al. |
| 2013/0115970 | A1 | 5/2013 | Hapsari et al. |

FOREIGN PATENT DOCUMENTS

| | | |
|---|---|---|
| WO | 2009116614 A1 | 9/2009 |
| WO | 2011136208 A1 | 11/2011 |

OTHER PUBLICATIONS

LG Electronics: "Discussion on neighboring macro cell measurement", 3GPP Draft; R4-110812, 3rd Generation Partnership Project (3GPP), Mobile Competence Centre; 650, Route Des Lucioles; F-06921 Sophia-Antipolis Cedex; France, vol. RAN WG4, no. Taipei, Taiwan; 20110221, Feb. 17, 2011, XP050501239, [retrieved on Feb. 17, 2011].

Motorola: "Reference signals for mobility related measurements", 3GPP Draft; R1-071330 Meas Ref, 3rd Generation Partnership Project (3GPP), Mobile Competence Centre; 650, Route Des Lucioles; F-06921 Sophia-Antipolis Cedex; France, vol. RAN WG1, no. St. Julian; 20070403, Apr. 3, 2007, XP050105282, [retrieved on Apr. 3, 2007].

Qualcomm Incorporated: "Discussion of eMBMS signal quality parameters", 3GPP Draft; R1-113373 MBMS Signal Quality Parameters, 3rd Generation Partnership Project (3GPP), Mobile Competence Centre; 650, Route Des Lucioles; F-06921 Sophia-Antipolis Cedex; France, vol. RAN WG1, no. Zhuhai; 20111010, Oct. 6, 2011, XP050538599, [retrieved on Oct. 6, 2011].

Kottkamp, et al., "LTE Release 9 Technology Introduction White paper". [Online] Dec. 2011, pp. 1-44. http://www2.rohde-schwarz.com/file_17282/1MA191_0E.pdf (accessed Sep. 25, 2012).

Korean Office Action dated Jul. 8, 2015, for Korean Patent Application Serial No. 2014-7016569, 4 pages.

LTE, "Multimedia Broadcast/Multicast Service (MBMS); Protocols and codecs (Release 10)", 3GPP TS 26.346 V10.1.0, Sep. 2011, pp. 25, 86-89, URL, http://www.3gpp.org/ftp/Specs/archive/26_series/26.346/26346-a10.zip, 151 Pages.

Qualcomm Inc., "Physical Layer Measurements for eMBMS", 3GPP TSG-RAN #54, RP-111725, Dec. 2011, pp. 1-2, URL, http://www.3gpp.org/ftp/tsg_ran/TSG_RAN/TSGR_54/docs/RP-111725.zip.

Translation of First office Action for Japanese Application No. 2014-542452 dated Apr. 28, 2015, pp. 1-5.

Notice to File a Response for Korean Patent Application No. 2014-7016569, dated Feb. 19, 2016, 4 pages.

Translation of Final Office Action for Japanese Application No. 2014-542452 dated Feb. 9, 2016, 4 pages.

Vodafone et al., "MMDT Requirements for QoS Improvements", 3GPP TSG-RAN WG2 Meeting #76, R2-115909, Nov. 7, 2011, 2 pages.

\* cited by examiner

METHOD AND APPARATUS FOR PHYSICAL LAYER MEASUREMENTS IN MULTICAST BROADCAST MULTIMEDIA SERVICE SYSTEMS

CROSS-REFERENCE TO RELATED APPLICATION(S)

This application claims the benefit of U.S. Provisional Application Ser. No. 61/561,201, entitled "METHOD AND APPARATUS FOR PHYSICAL LAYER MEASUREMENTS IN MULTICAST BROADCAST MULTIMEDIA SERVICE SYSTEMS" and filed on Nov. 17, 2011, which is expressly incorporated herein by reference in its entirety.

BACKGROUND

1. Field

The present disclosure relates generally to communication systems, and more particularly, to a method and apparatus for physical layer measurements in multicast broadcast multimedia service systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Multimedia Broadcast Multicast Services (MBMS) is a point-to-multipoint interface specification for existing and upcoming 3GPP cellular networks. MBMS is designed to provide efficient delivery of broadcast and multicast services, both within a cell as well as within the core network. For broadcast transmission across multiple cells, it defines transmission via single-frequency network configurations. Target applications include mobile TV and radio broadcasting, as well as file delivery and emergency alerts.

LTE provides for enhanced Multimedia Broadcast Multicast Services (eMBMS) that offers transport features for sending similar content information to all users in a cell (broadcast) or to a given set of users (subscribers) in a cell (multicast). eMBMS is differentiated from IP-level broadcast or multicast, which does not offer sharing of resources on the radio access level. In eMBMS, it is possible to either use a single eNode-B or multiple eNode-Bs for transmission to multiple UEs. Multicast-Broadcast Single Frequency Network (MBSFN) is the definition for the latter.

MBSFN is a transmission mode that exploits LTE's OFDM radio interface to send multicast or broadcast data as a multi-cell transmission over a synchronized single-frequency network (SFN). The transmissions from the multiple cells are synchronized so that the transmissions arrive at the UE within the OFDM Cyclic Prefix (CP) so as to avoid Inter-Symbol Interference (ISI). In effect, this makes the MBSFN transmission appear to a UE as a transmission from a single large cell, dramatically increasing the Signal-to-Interference Ratio (SIR) due to the absence of inter-cell interference.

eMBMS provides certain quality parameters related to service level performance for MBSFN. However, these service level performance parameters are not directly related to eMBMS signal qualities. To improve performance of such data transfer operations as streaming and file transfer operations, having parameters directly related to eMBMS signal qualities available would be useful. For example, having physical layer measurements for eMBMS signals would be useful to determine network parameters.

SUMMARY

A method, an apparatus, and a computer program product for wireless communication are provided in which a reporting requirement is received by a UE for one or more Multicast-Broadcast Single Frequency Network (MBSFN) physical layer parameters. The UE obtaining the one or more MBSFN physical layer parameters; and creating a report based on the obtained one or more MBSFN physical layer parameters. The UE may obtain the one or more MBSFN physical layer parameters using user plane or control plane-based mechanisms. The user plane-based mechanism involves the use of a modified version of the reporting mechanism for Quality of Experience (QoE) metrics. The control plane-based mechanism involves the use of a modified version of the reporting mechanism for the Minimization of Drive Tests (MDT) metrics.

DETAILED DESCRIPTION

Figure 1:
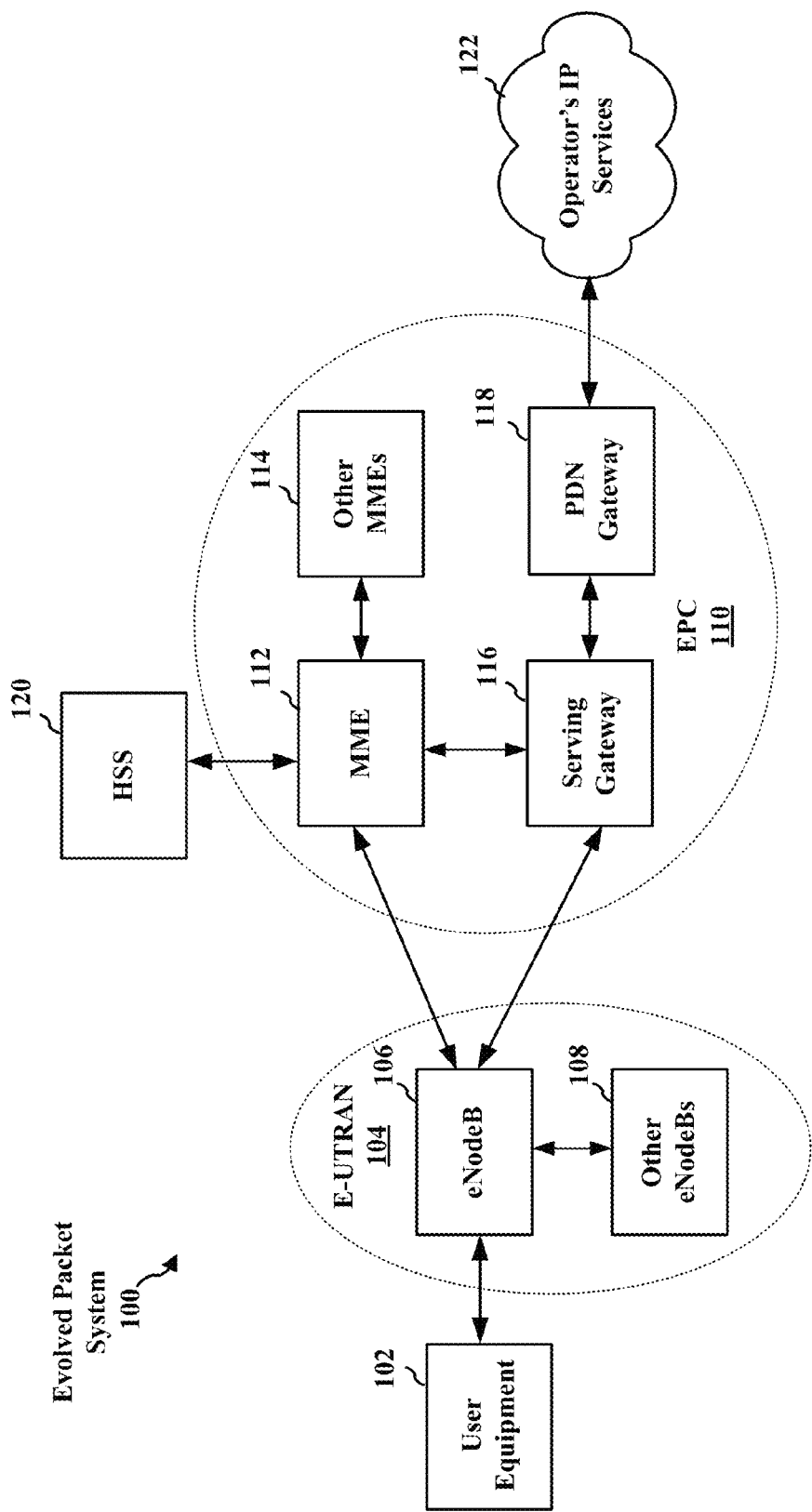
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
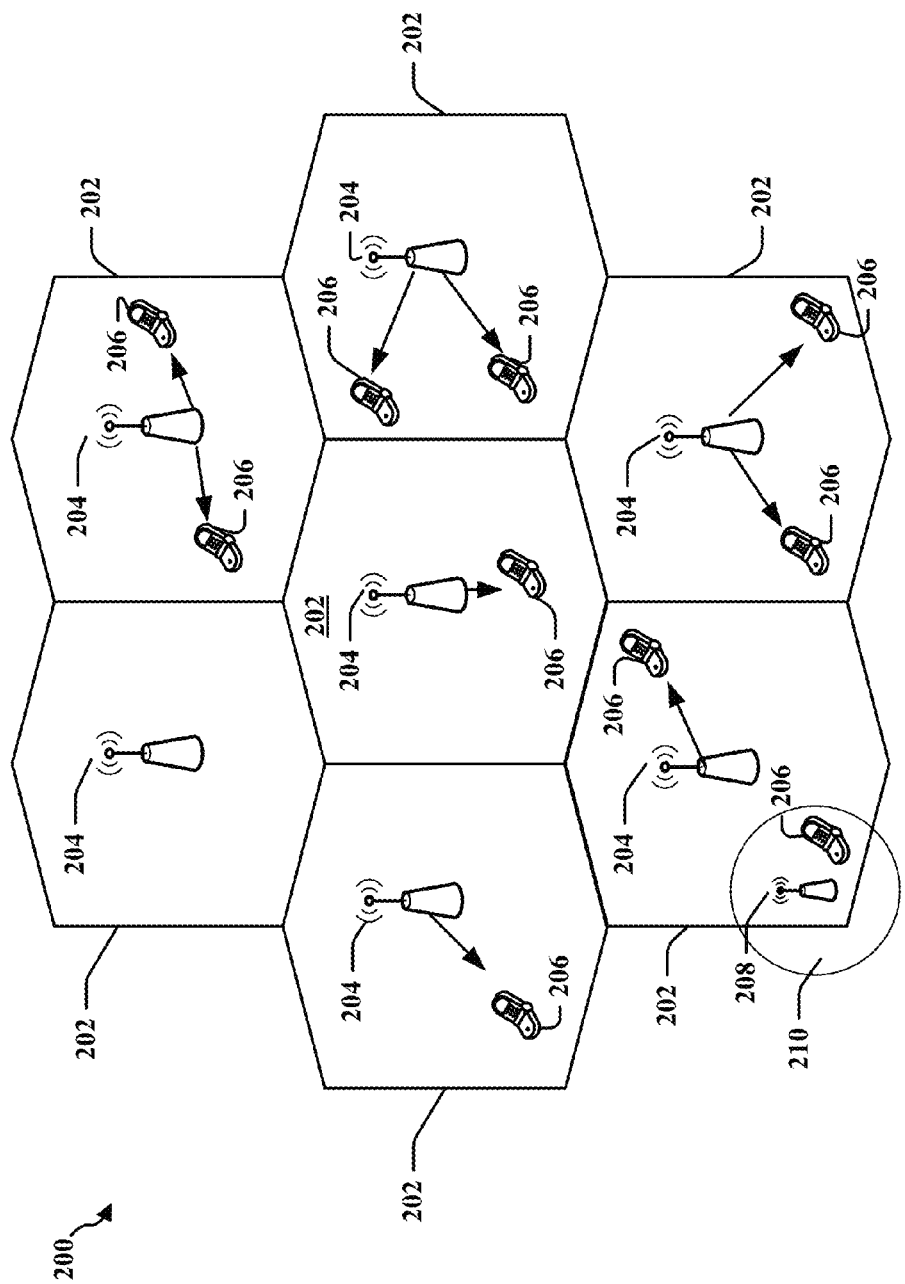
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data in a simultaneous fashion on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
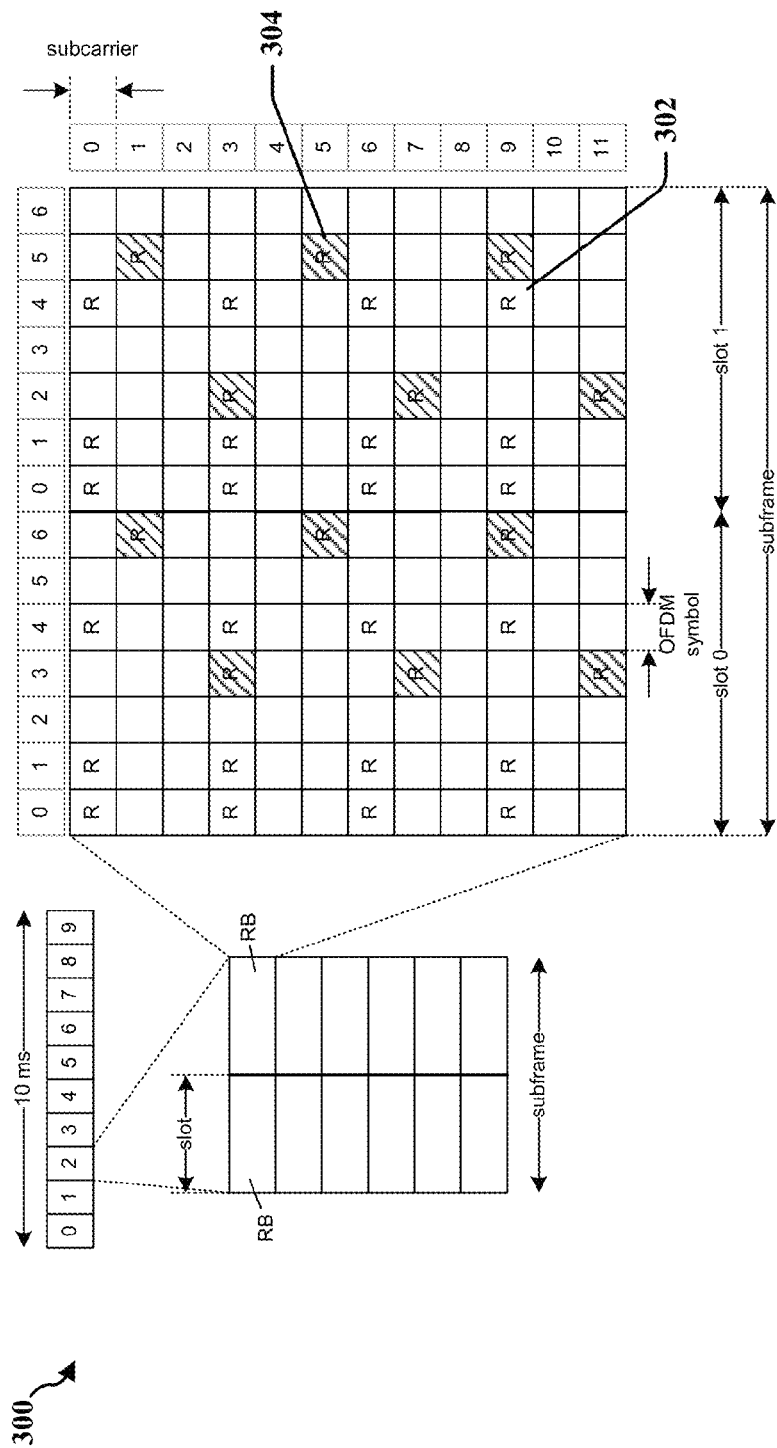
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
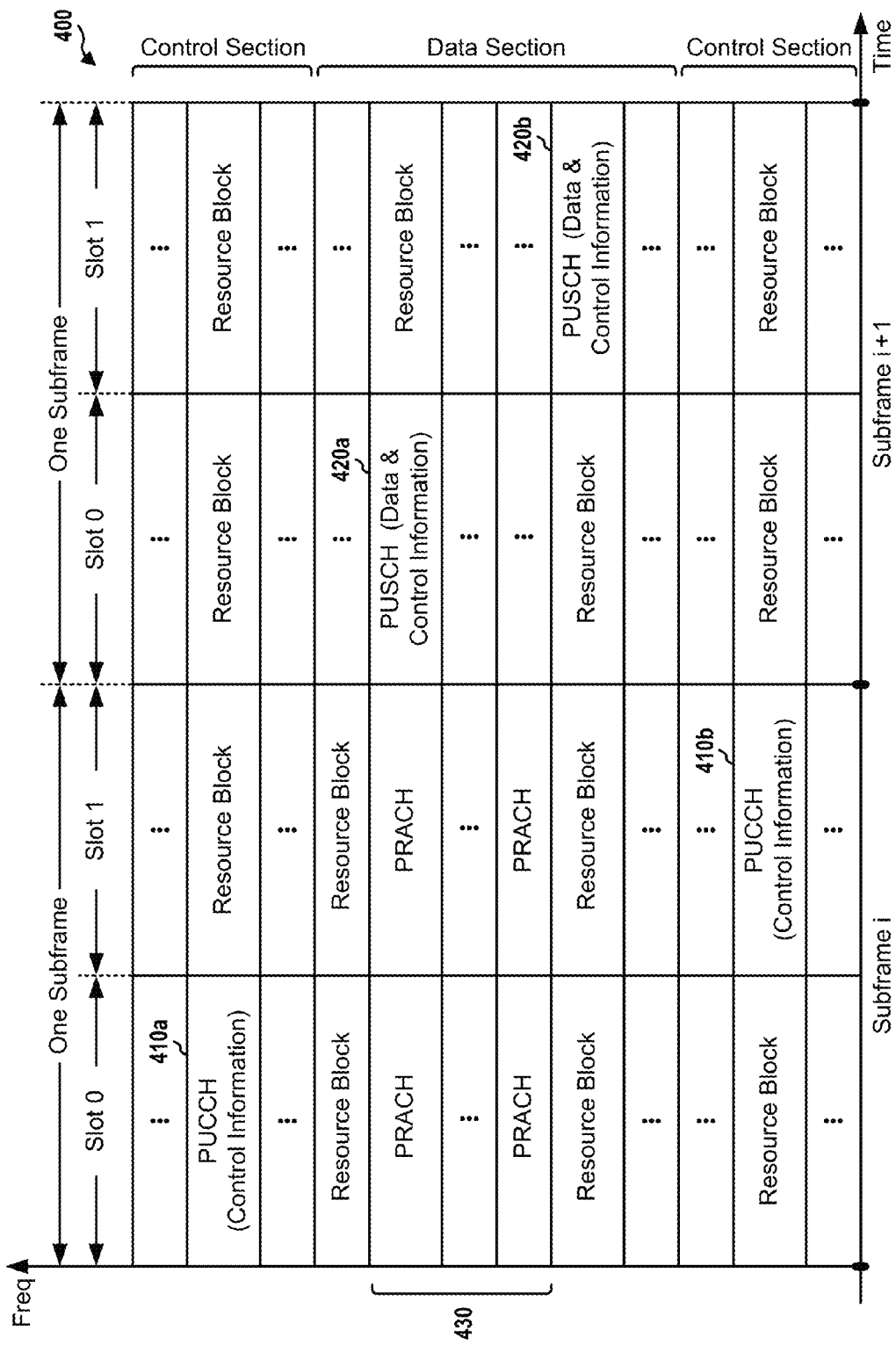
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
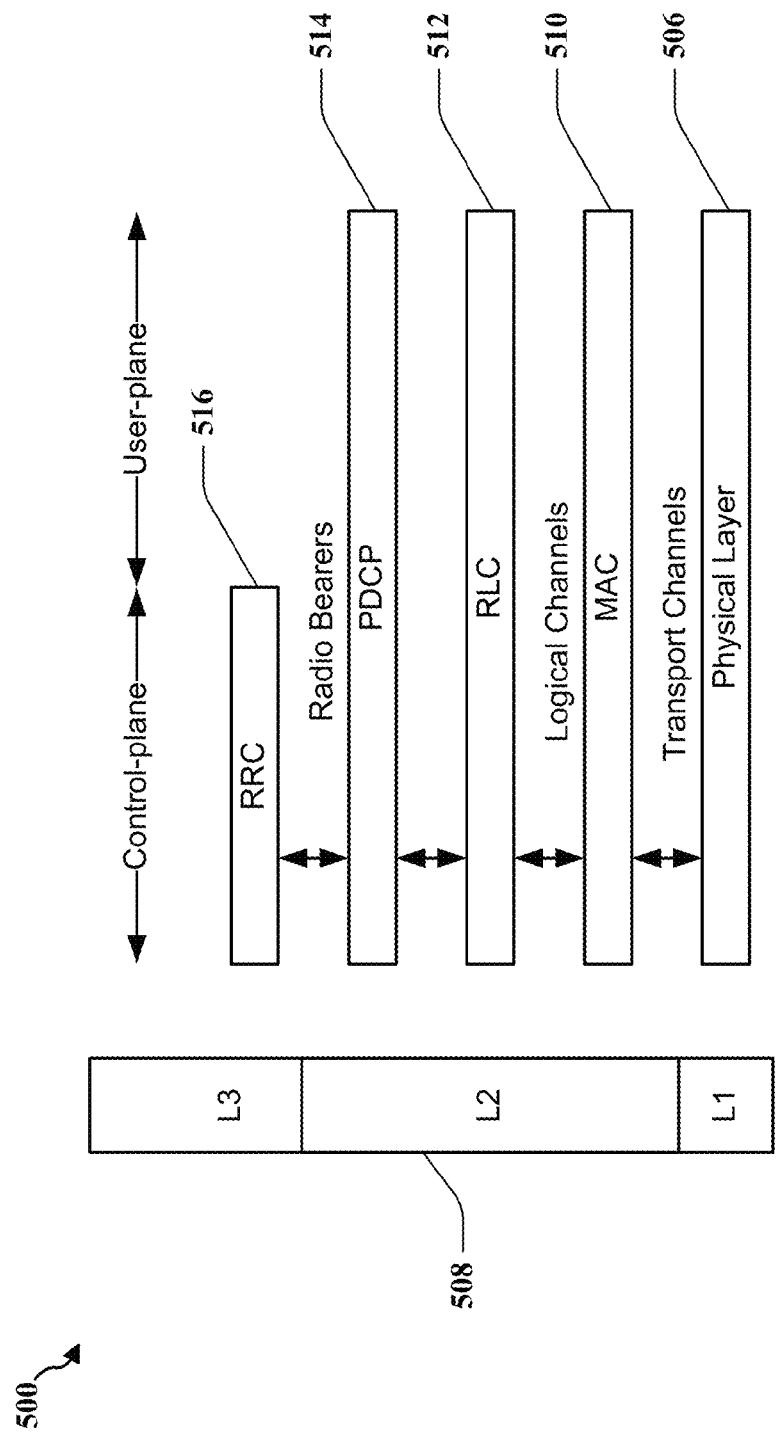
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a Radio Link Control (RLC) sublayer 512, and a Packet Data Convergence Protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a Radio Resource Control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
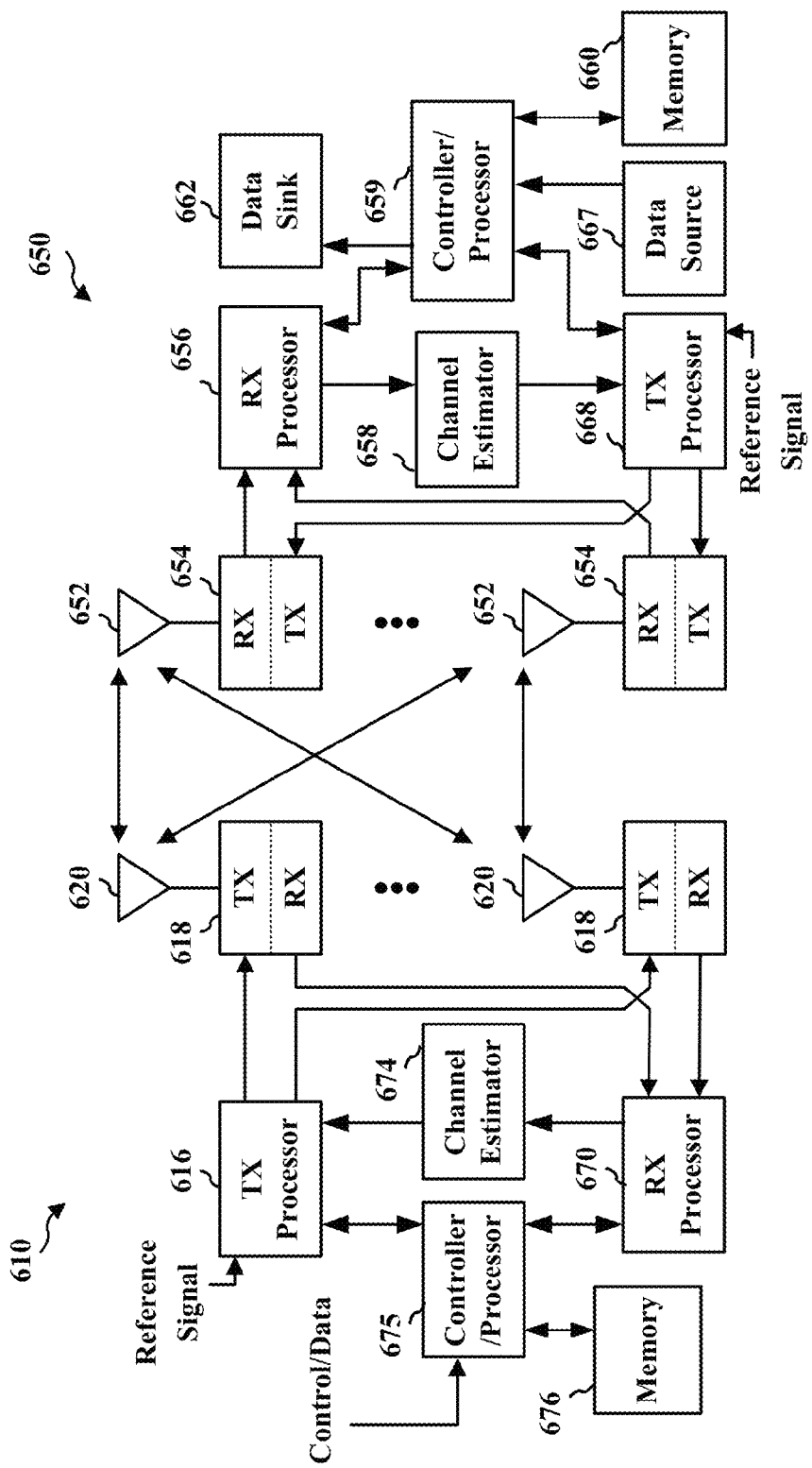
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate Forward Error Correction (FEC) at the UE 650 and mapping to signal constellations based on various modulation schemes (e.g., Binary Phase-Shift Keying (BPSK), Quadrature Phase-Shift Keying (QPSK), M-Phase-Shift Keying (M-PSK), M-Quadrature Amplitude Modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
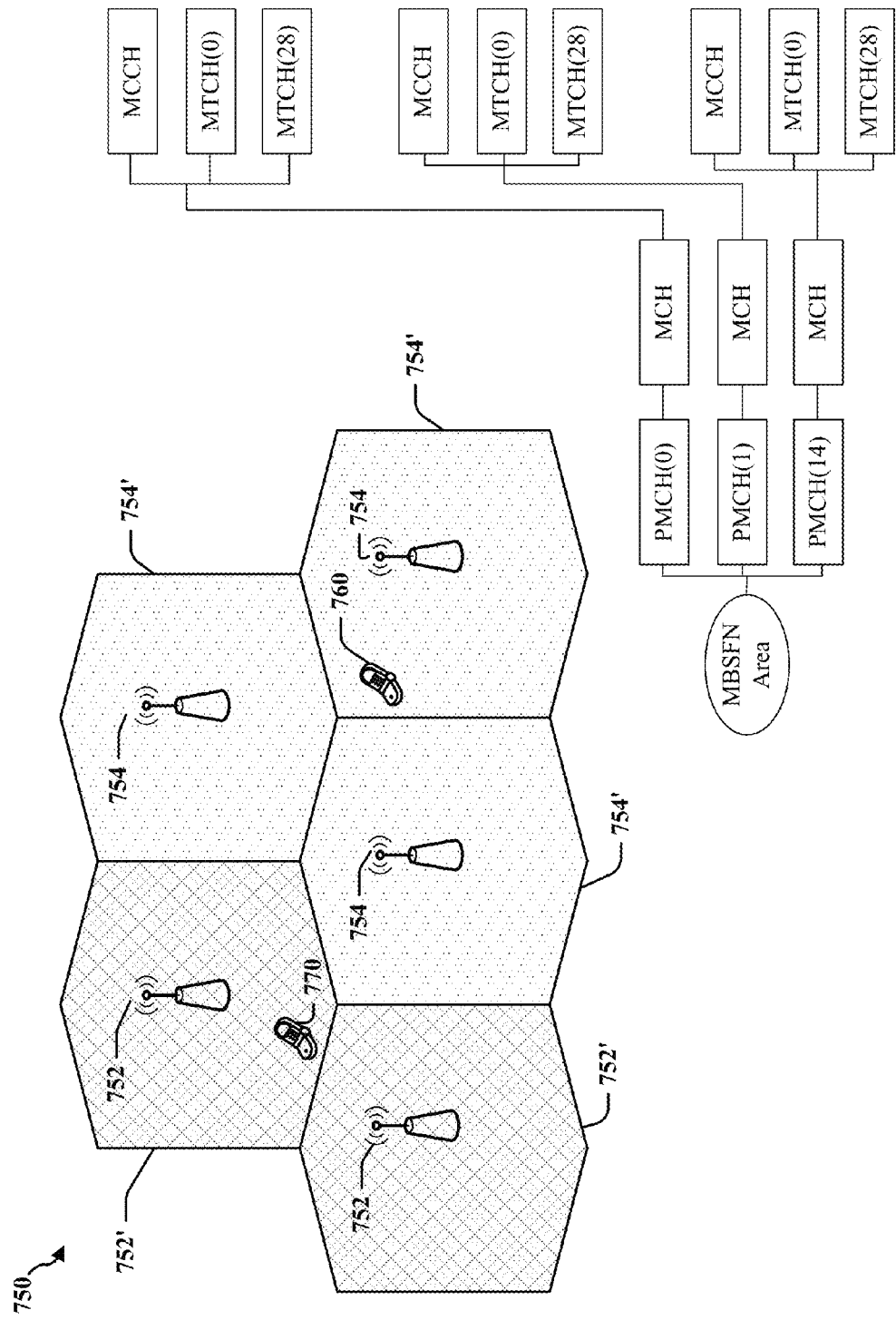
FIG. 7 is a diagram illustrating evolved Multicast Broadcast Multimedia Service (eMBMS) in a Multimedia Broadcast over a Single Frequency Network (MBSFN).

FIG. 7 is a diagram 750 illustrating evolved Multicast Broadcast Multimedia Service (eMBMS) in a Multimedia Broadcast over a Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data in a synchronized manner. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of Physical Multicast CHannels (PMCH) (e.g., 15 PMCHs). Each PMCH corresponds to a Multicast CHannel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

3GPP currently specifies user plane and control plane-based mechanisms for data collection and reporting. The user plane-based mechanism, also referred to as reception reporting procedures, is specified in 3GPP TS 26.346 for Quality of Experience (QoE) metrics for file downloading and streaming. The measurements are configured and reported via service layer signaling to an operator-designated server. The control plane-based mechanisms, which include Minimization of Drive Tests (MDT) functionality, are specified in 3GPP TS 37.320 for radio performance measurements. These measurements are configured and reported via control plane signaling to an operator-designated server.

For the download delivery method of MBMS, the reception reporting procedure may be used to either report the complete reception of one or more files, or to report statistics on the stream, or to do both. For the streaming delivery method of MBMS, the reception reporting procedure is used to report statistics on the stream. Current types of metrics included in reception reports include the QoE metrics. QoE is a subjective measure of a user's experiences with a service such as a streaming broadcast, and measures metrics that users will directly perceive as a quality parameter. Other types of metrics may be included in reception reports.

Four current reporting types for statistics are defined in 3GPP TS 26.346:
  RAck (Reception Acknowledgement)
  StaR (Statistical Reporting for successful reception)
  StaR-all (Statistical Reporting for all content reception), and
  StaR-only (Statistical Reporting without Reception Acknowledgement).

QoE metrics are present in StaR/StaR-all/StaR-only reporting types, but not in RAck.

3GPP TS 26.346 also defines a sample UE selection process for reception reporting, where a random subset of UEs may submit a report during every reporting period. A samplePercentage attribute may be used to determine a percentage of UEs that is to send the report. Specifically, each UE generates a random number that is uniformly distributed in the range of 0 to 100. A UE will send a reception report when the generated random number is of a lower value than the samplePercentage. Furthermore, in addition to specifying how the UE determines a reception report is needed, 3GPP TS 26.346 also describes when the UE is to send such a report. For example, an MBMS client may randomly select one of the service URIs from the list specified in Associated Delivery procedure fragment's postFileRepair element.

Although current MBSFN reception reporting provides certain information with regard to the communication link, it would be desirable to measure and report new physical layer parameters. For example, being able to log the signal strength and signal-to-noise ratio (SNR) of a broadcast signal during the duration of a file delivery, or during streaming sessions carried over file delivery sessions, may be useful for several reasons. For example, signal strength fluctuations may directly influence user behavior in accessing the content. Determining that Received Signal Strength Indicator (RSSI) levels were decreased toward the end of a viewing session of a real-time stream by a user may indicate that the reason the user stopped viewing the content was due to deteriorating radio conditions. Further, since the end of a session may not be predicted a priori, the UE may have to collect signal strength measurements as well.

Another reason for having signal strength information is that weak performance of media level metrics may or may not correlate with radio level performance. Collecting performance information at both the media and radio levels may enable determination of the cause of any performance degradation.

Yet another reason for collecting signal strength information is that it may be desirable to characterize a particular broadcast radio environment. The model for SNR variations during file delivery is not very well understood. Collecting signal strength measurements for random users during what amounts to random reception times (e.g., file delivery may be decided at the server independently of the user's radio conditions) would help in understanding the radio model that should be applied to a file delivery user population, and help in optimizing code rates, FEC, MCS selection, and bandwidth utilization. Furthermore, collecting signal strength measurements at expected file delivery times would enable the refinement of the channel model to take into account such factors as time-of-day variations.

MBSFN physical layer measurements for eMBMS may be added to existing measurements in accordance with the approach disclosed herein. In one aspect, the MBSFN physical layer measurements may be correlated with existing QoE metrics. For example, the physical layer parameters reported by a UE may be associated with the QoE metrics reported by the same UE. This will allow the network operator to debug errors more easily. In another aspect, to perform MBSFN physical layer measurements, a UE may only need to measure PMCH subframes, which are allocated for the services of interest to the UE. The UE is not required to monitor other MBMS subframes for PMCH. This may simplify the UE implementation. In still another aspect, a UE may report MBSFN physical layer measurement parameters and other operator sensitive parameters to a network entity that is under control of the network operator while allowing the reporting of existing QoE metrics to third parties. In yet still another aspect, specific predetermined UEs are allowed to report MBSFN physical layer measurement parameters for certain uses (e.g., debugging purposes).

Figure 8:
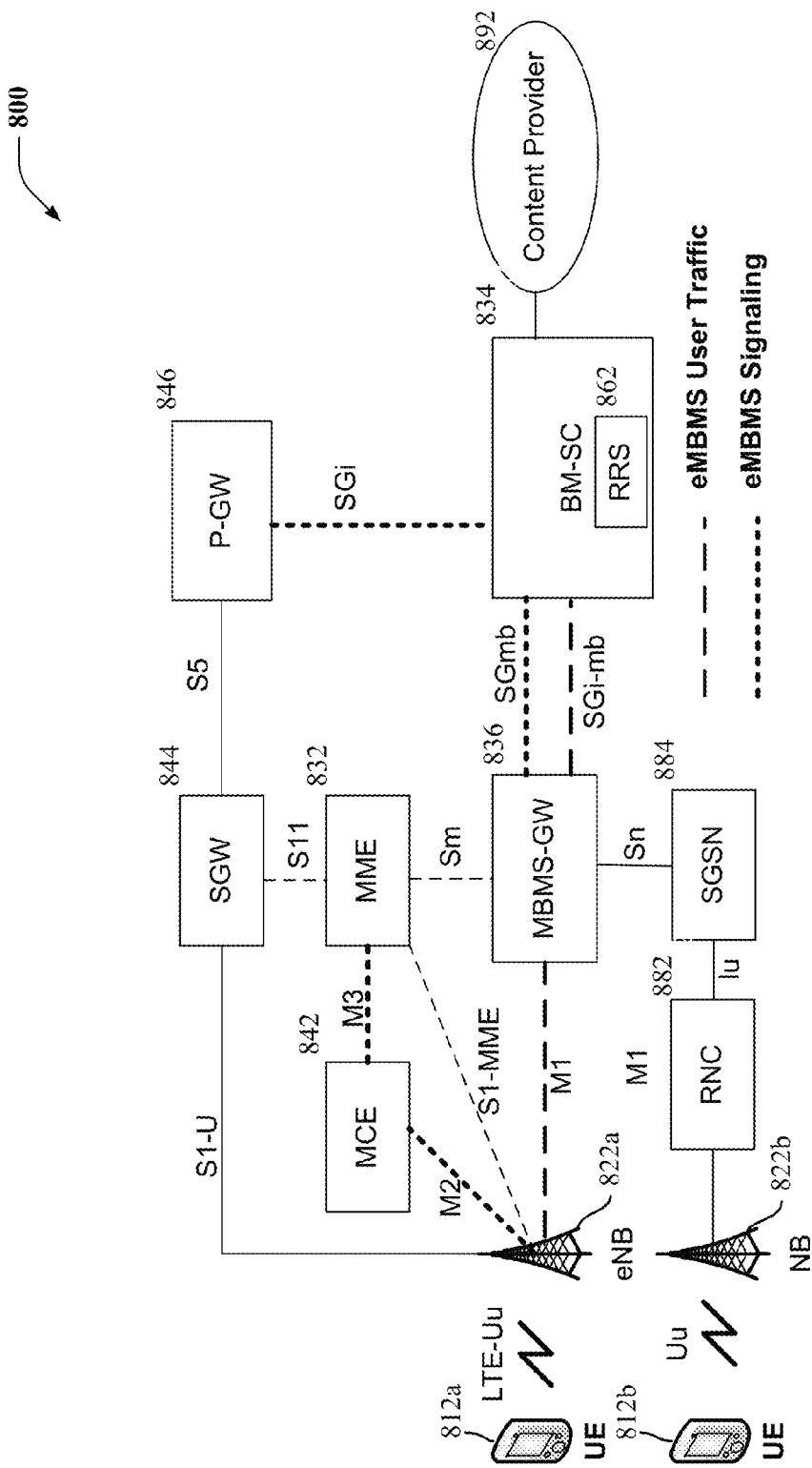
FIG. 8 is a diagram illustrating a more detailed architecture for an eMBMS over wireless networks.

FIG. 8 illustrates an architecture 800 for a UE 812a monitoring and reporting MBMS physical layer parameters through an eNode B 822a, where the eNode B 822a may be responsible for communicating with the UE 812a. The architecture 800 includes a Mobility Management Entity (MME) 832, which typically coordinates paging services.

The architecture 800 also includes a Broadcast Multicast Service Center (BM-SC) 834, which may be the functional entity in charge of providing eMBMS service to the end-user. For that purpose, the BM-SC 834 serves as an entry point for content providers such as a content provider 892 or any other broadcast/multicast source that may be external to the network. The BM-SC 834 may contain a Reception Report Server (RRS) 862 that provides reception reporting functionality, as further described herein. The BM-SC 834 typically coordinates broadcast flows that are sent to a MBMS Gateway (MBMS-GW) 836.

The MBMS-GW 836 receives incoming broadcast/multicast traffic from the BM-SC 834, with a role to broadcast the packets to all eNodeBs such as eNodeBs 822a, 822b within a service area, as well as session management (e.g., starting and stopping sessions). The MBMS-GW 836 may also be in charge of collecting information relative to the distributed eMBMS traffic for each UE having an active eMBMS session.

The architecture 800 illustrated in FIG. 8 may also include other supporting functional modules that are described herein for further background. It should be noted that further details behind the functioning of the previously described modules, as well as the modules described hereafter, may be found in the technical specifications promulgated for 3GPP, and certain details are not discussed here to avoid unnecessarily complicating the description.

The architecture 800 includes a Serving Gateway (SGW) 844. The SGW 844 routes and forwards user data packets, while also acting as the mobility anchor for the user plane during inter-eNodeB handovers and as the anchor for mobility between LTE and other 3GPP technologies. For idle state UEs, the SGW 844 terminates the downlink data path and triggers paging when downlink data arrives for the UE. The SGW 844 manages and stores UE contexts (e.g. parameters of the IP bearer service, network internal routing information).

Further, a Packet Data Network (PDN) Gateway (P-GW) 846 may be included in the architecture 800 to support eMBMS signaling and provide connectivity from the UEs to external packet data networks by being the point of exit and entry of traffic for the UEs. A UE may have simultaneous connectivity with more than one P-GW 846 for accessing multiple PDNs. The P-GW 846 performs policy enforcement, packet filtering for each user, charging support, lawful interception and packet screening. Another role of the P-GW 846 may be to act as the anchor for mobility between 3GPP technologies such as LTE and non-3GPP technologies such as WiMAX and 3GPP2 (CDMA 1× and EvDO).

The architecture 800 also includes a Radio Network Controller (RNC) 882, which may be a governing element in the UTRAN and responsible for controlling the Node Bs that are connected to it (e.g., Node B 822b). The RNC 882 carries out radio resource management, some of the mobility management functions and may be the point where encryption is done before user data is sent to and from UEs (e.g., UE 812b). The RNC 882 connects a Packet Switched Core Network through a Serving GPRS Support Node (SGSN) 884.

The SGSN 884 may be responsible for the delivery of data packets from and to UEs within its geographical service area. Tasks of the SGSN may include packet routing and transfer, mobility management (attach/detach and location management), logical link management, and authentication and charging functions. The location register of the SGSN 884 stores location information (e.g., current cell, current VLR) and user profiles (e.g., IMSI, address(es) used in the packet data network) of all GPRS users registered with this SGSN.

A MBMS Coordination Entity (MCE) 842 may ensure allocation of resources for given services across all the eNodeBs of a given Multimedia Broadcast Service Multicast Single Frequency Network (MBSFN) area. It may be the task of the MCE 842 to ensure that the eNodeBs are appropriately configured for MBSFN operations, which is further described herein.

Two potential approaches may be used to collect and report MBSFN physical layer measurement parameters, including user plane-based mechanisms and control plane-based mechanisms. As will be discussed below, the user plane-based approach provides for correlation between MBSFN physical layer measurement parameters and existing QoE metrics. However, there may be security issues that need to be addressed, in addition to being able to specify which UEs should be measuring and reporting the results. Further, detailed information such as location information also may be supported in the user plane-based approach. In contrast, the control plane-based approach may require a mechanism for correlating the MBSFN physical layer measurement parameters and service layer information reported by a UE. Also, the control plane-based approach may not provide the capability to determine information as to which UE is listening to which service. However, the control plane-based approach generally does not suffer from the potential security concerns associated with the user plane-based approach.

Figure 9:
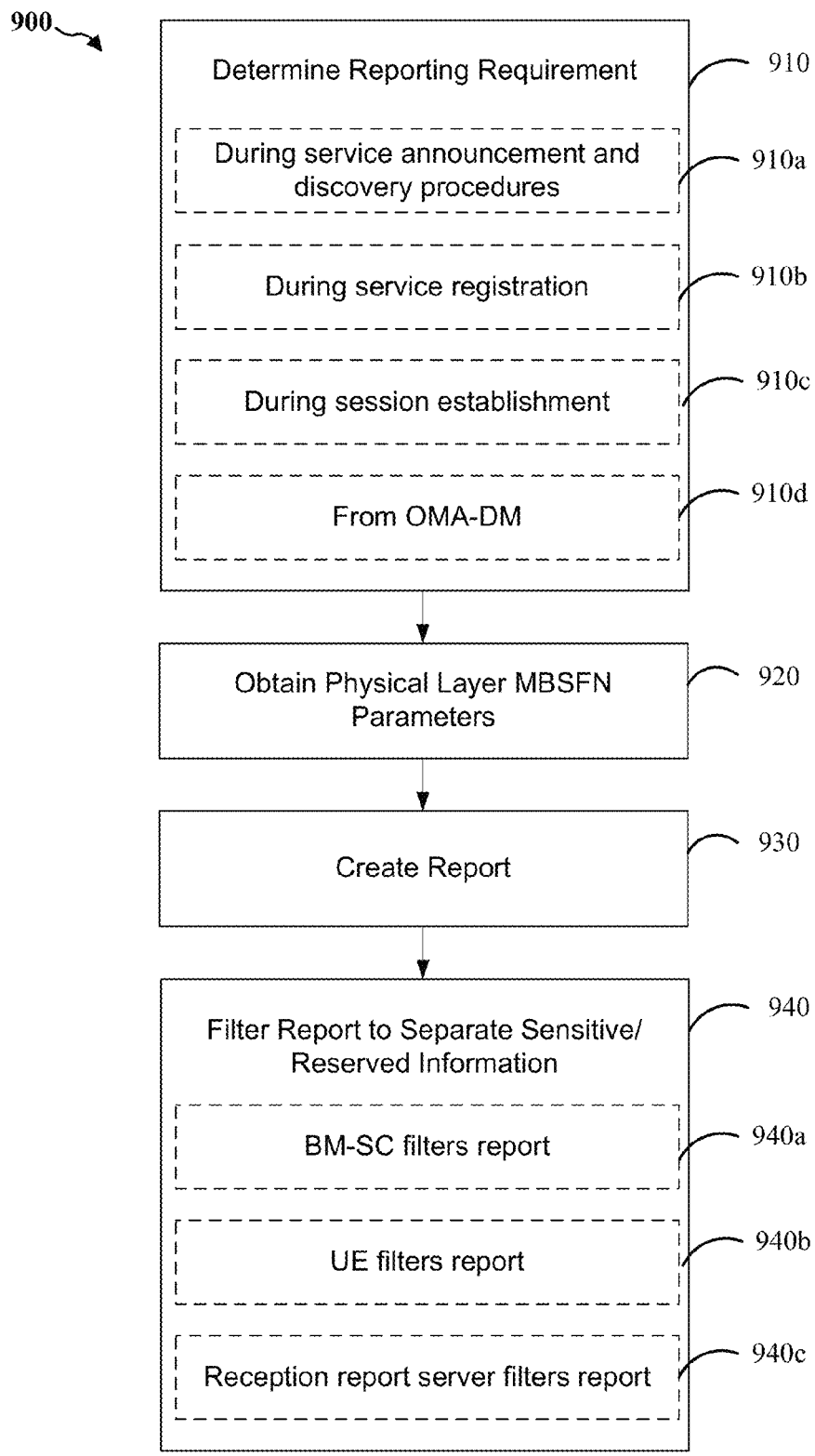
FIG. 9 is a flow diagram illustrating a user plane-based approach for reporting physical layer parameters for MBSFN.

FIG. 9 illustrates a user-planed based approach 900 for reporting MBSFN physical layer parameters based on one aspect of the disclosed reporting mechanism. The new physical layer parameters may be reported via reception reporting procedure in the service layer. At certain operations in the approach 900, several options may be available for achieving the described operation. Each of these options is represented by a dashed line and is meant to be understood as an example and not the exclusive manner by which the operation may be achieved.

At 910, the UE determines whether it needs to report MBSFN physical layer parameters based on a recent reporting requirement. The disclosed approach allows the selection of specific UEs to report whereas existing approaches only allow macro level selection of number of devices to report. For example, the UE may be configured using the mechanism in 3GPP TS 26.346, which promulgates that an MBMS server can specify measurement configurations for each session through a Session Description Protocol (SDP).

Several options are available for UE selection, including, in one aspect, receiving a notification in service announcement and discovery. The service announcement and discovery may be either broadcast to all UEs or sent to each UE through a unicast channel, as illustrated by 910a. The service announcement may include in a User Service Description (USD) an Associated Delivery procedure fragment that specifies a list of UEs that need to report. In another aspect, as illustrated by 910b, the UE may determine it needs to report during service registration procedures. In this aspect, the UE may be specifically chosen to report. In yet another aspect, as illustrated by 910c, the UE may determine it needs to report during MBMS session establishment procedures. For example, the UE may receive an indication from an MME based on an indicator from the BM-SC. The UE will receive the notification from the MME via a broadcast (for example, MCCH or SIB) or via unicast. As the BM-SC will not know from which MME the UE will receive the notification, the BM-SC may transmit the notification to multiple MME's. In still yet another aspect, as illustrated by 910d, the UE may be configured to report using Open Mobile Alliance (OMA) Device Management (DM) (OMA-DM) protocols. For example, in 3GPP TS 26.346, OMA-DM may currently be used to specify a default measurement configuration. An indication may be added to inform the UE to report the parameters as part of the default transmission. Thus, for allowing the specification of certain UEs to report MBSFN physical layer measurements, OMA-DM may be used to configure specific UEs that should report. Those specific UEs may bypass current reporting rules and report the new MBSFN physical layer measurements and the existing QoE metrics at the end of a session.

At 920, the UE may obtain the MBSFN physical layer parameters. In one aspect, these parameters may include such parameters as MBSFN Reference Signal Received Power (RSRP), MBSFN Reference Signal Received Quality (RSRQ), and may include measured SNR. To obtain the parameters, in one aspect the UE may measure PMCH subframes that are allocated for the services of interest to the UE. These parameters may allow the diagnosing of network issues versus UE issues. For example, the parameters may allow the determination that the UE is having hardware issues.

MBSFN RSRP may be defined as a linear average over the power contributions of the resource elements that carry MBSFN reference signals within the measurement frequency bandwidth that is considered. In one aspect of the disclosed approach, the MBSFN Reference Signal (RS) is sent on a particular antenna port. For example, antenna port 4 may be used. The considered measurement bandwidth may be either the download bandwidth or some configured number signalled in a System Information Block (SIB) (e.g., SIB13). Preferably, MBSFN RSRP captures useful signal information within the cyclic prefix. Further, any interference resulting from an excessive delay spread, plus non-MBSFN cell and MBSFN cells from other MBSFN areas may be minimized. In the presence of a MIMO transmission of MBSFN signals, the UE may also use reference signals sent from other PMCH antennas to determine MBSFN RSRP.

In one aspect of the disclosed approach, MBSFN RSRQ may be defined as the ratio:

$$\frac{N \times \text{MBSFN\_RSRP}}{\text{E-UTRA carrier MBSFN\_RSSI}}, \quad (1)$$

where MBSFN_RSSI is the E-UTRA Carrier MBSFN Received Signal Strength Indicator (RSSI), N is the number of resource blocks of the E-UTRA carrier MBSFN_RSSI measurement bandwidth. Further, the measurements in the numerator and denominator may be made over the same set of resource blocks. Also, MBSFN RSSI includes the linear average of the total received power observed only in OFDM symbols containing reference symbols, in the measurement bandwidth, over N number of resource blocks by the UE from all sources. For example, the sources of received power may include co-channel MBSFN cells, non-MBSFN cells, and MBSFN cells from other MBSFN areas, adjacent channel interference, interference due to excessive delay spread beyond cyclic prefix length, thermal noise, and other sources.

Further, MBSFN RSRQ may need better quantization granularity than unicast RSRQ to provide sufficient granularity at high SNR values. Lower SNR values for unicast RSRQ may be acceptable because the signal levels for unicast RSRQ are in a relatively low range. For example, the reporting range of unicast RSRQ may be defined from −19.5 dB to −3 dB with a 0.5 dB resolution. In contrast, for MBSFN RSRQ, SNR values may be higher due to the nature of MBSFN transmissions. As a result, a better granularity may be preferred at higher signal level ranges. The reported MBSFN RSRQ may be combined over multiple receive antennas or may be no lower than the MBSFN RSRQ of any of the individual receive antennas. In the latter approach, the reported MBSFN RSRQ may be considered to equal at least the reported result from a single antenna scenario.

In one aspect of the disclosed approach, MBSFN SNR may be also reported where the MBSFN SNR is the demodulated SNR with receive antenna combining.

To be able to base the measurement of eMBMS subframes on relevant transmissions, the MBSFN physical layer-related parameters may be based on the PMCH transmissions. For example, the measurement may rely on PMCH RS and/or PMCH data transmissions. In one approach, an eNB may schedule unicast transmission in eMBMS subframes allocated in MCCH/MCH scheduling information (MSI). For example, the eNB may use MCCH to allocate eMBMS subframes for all PMCHs. The MSI may further allocate eMBMS subframes for each MTCH within a PMCH. MCCH may be modified once every 512 or 1024 radio frames, while MSI may be modified once every 8/16/32/64/128/256/512/1024 radio frames.

Due to static scheduling of eMBMS, it is possible that some allocated eMBMS subframes may be left empty and the eNB may use those subframes to schedule unicast transmission to UEs. UEs monitoring those subframes for eMBMS transmission may not check for unicast scheduling, and hence, not be aware of the absence of PMCH RS or PMCH data transmissions. The resulting MBSFN measurements may be corrupted due to the unicast transmission.

In one option for avoiding the use of eMBMS subframes for MBSFN physical layer measurements where unicast traffic transmission is scheduled, the UE may perform MBSFN physical layer measurements in the monitored PMCH subframes, as scheduled by MSI. For measurements pursuant to each monitored PMCH subframe, the UE may perform thresholding to determine whether to use the measurement or not. Thus, no signaling change is needed. However, this option may not be robust enough to differentiate between the case where the signal level is low (and should be captured in measurements) and the case where there is no PMCH at all (and should be ignored in measurements).

In another option, an eNB may signal to the UE that a subset of the allocated PMCH subframes has guaranteed MBSFN transmission, i.e., the eNB will always transmit MBSFN signals in the subset of PMCH subframes, while the remaining subframes may be used for unicast transmission. A suitable message that may be used to support the signaling of the PMCH subframes that have guaranteed MBSFN transmission is the MSI MAC control element. In another aspect, a new MAC control element may be used to signal the PMCH subframes. For example, in addition to allocating MBMS subframes for a MTCH, the MSI or the new MAC control element may also be used to inform the UE that a subset of scheduled subframes will have guaranteed MBSFN transmissions, while the remaining subframes may be used for unicast. Thus, the UE may perform MBSFN measurements on the signaled subset of allocated PMCH subframes. For the remaining allocated PMCH subframes, the UE may either not perform MBSFN measurements, or may apply thresholding to the measurements and report when a measurement exceeds a corresponding threshold.

At 930, the UE may generate a report that includes the parameter(s) obtained at 920. In one aspect, the report containing QoE metrics may include the new physical layer measurement parameters. Thus, a UE may report these new physical layer measurement parameters together with existing QoE metrics in the same report. In another aspect, the QoE metrics and the new physical layer measurement parameters may be reported at different times, and in different reports.

In one aspect of the disclosed approach, the UE may provide position information in addition to cell ID. For example, the UE may include location coordinates in the report. Location information may be obtained by the UE based on a stand-alone Global Navigation Satellite Systems (GNSS), such as the NAVSTAR Global Positioning System (GPS) of the United States or the GLObal'naya NAvigatsionnaya Sputnikovaya Sistema (GLONASS). In addition, a GNSS-based time stamp may be made part of the location information. Location reporting may be requested by BM-SC through USD, as previously described. If the location information is not available at the UE, the UE may not need to report it.

At 940, the report may be filtered to address security issues related to the inclusion of the new physical layer measurement parameters. For example, existing reports containing QoE metrics may be transmitted from the BM-SC to third parties or may be transmitted directly to the third parties such as content providers. These service layer reports thus may be made public. However, network operators may not want the new physical layer measurement parameters to be made available to third parties when the new physical layer measurement parameters are included with the other information in the existing reports.

To allow reporting of MBSFN physical layer measurement parameters and other operator-sensitive parameters to a network entity that is under the control of the network operator while allowing reporting of other existing QoE metrics to third parties, in another aspect of the proposed approach one or more new service URI(s) in Associated Delivery procedure fragments may be utilized. These URI(s) may be configured as specified in 3GPP TS 26.346. The UE may transmit existing QoE metrics based on existing standards while new MBSFN physical layer measurement parameters (or other operator sensitive parameters) may be reported to new service URI(s) specified by an entity such as the BM-SC.

In one aspect, as illustrated at 940a, a RRS such as RRS 862 may be implemented in the BM-SC to filter the reception reports before forwarding to a third party. In this approach, the BM-SC will configure RRS URI(s) to specify an operator controlled entity. The RRS may be used to keep the new physical layer measurement parameters or operator sensitive parameters within the network to control dissemination of such information.

In another approach, as illustrated at 940b, message filtering may be performed at the UE. In this approach, the UE may be preconfigured with different URI(s), and the UE may send existing reception reports based on current procedures to an existing URI while the new physical layer measurement parameters are sent in another report to the configured URI(s). The RRS that receives the new physical layer measurement parameters may keep the new physical layer parameters within the network.

In yet another aspect, as illustrated at 940c, a new RRS may be specified by the network operator to receive and filter the reports. In this aspect, new service URI(s) may be added to the Associated Delivery procedure fragment. The UE may then send reception reports with existing QoE information based on the current rule while the new physical layer parameters and/or operator sensitive parameters are sent in another report to the new service URI(s).

Figure 10:
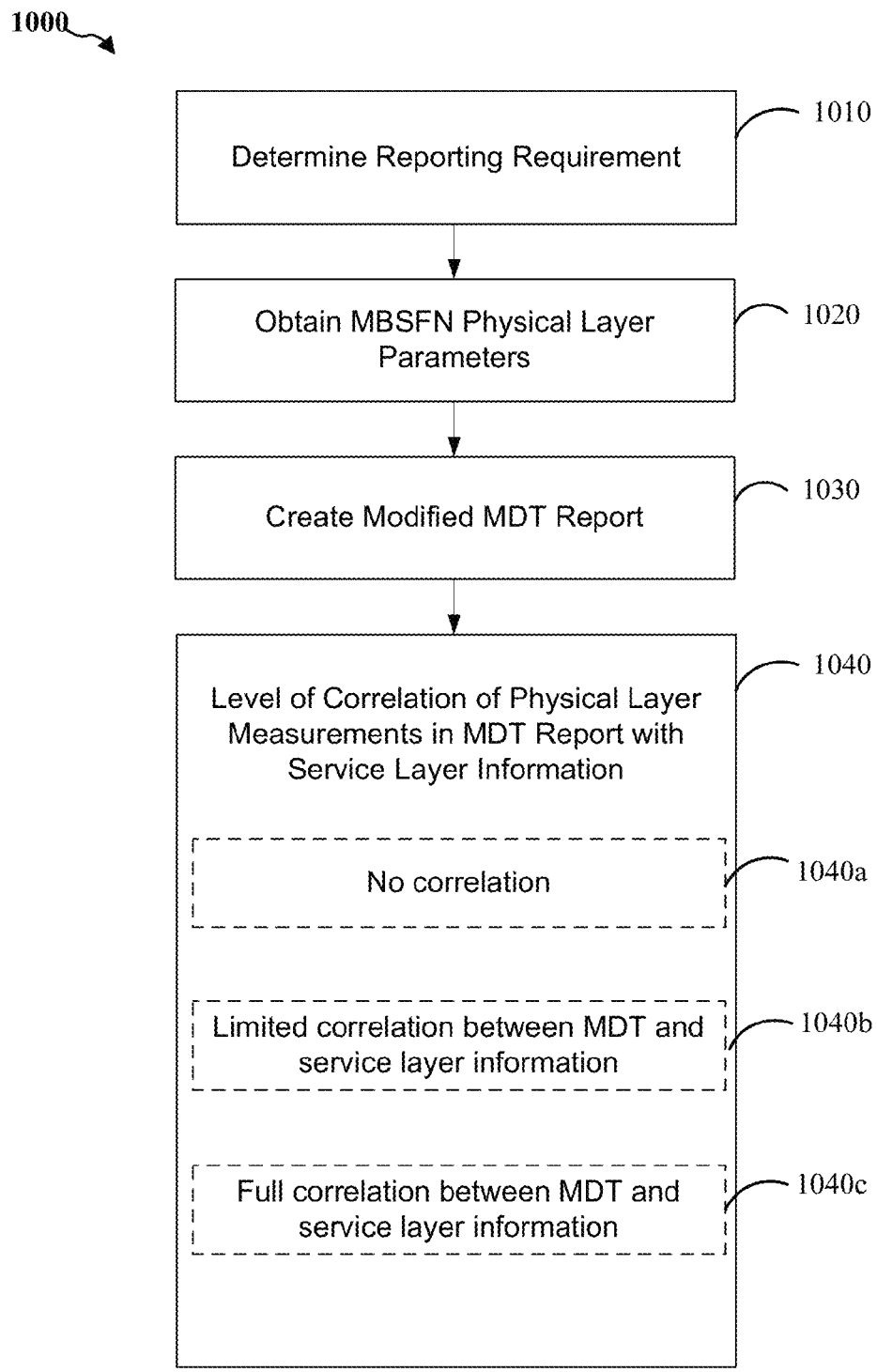
FIG. 10 is a flow diagram illustrating a control plane-based approach for reporting physical layer parameters for MBSFN.

FIG. 10 illustrates a control plane-based approach 1000 that utilizes a Minimization of Drive Tests (MDT) architecture to report MBSFN physical layer parameters. In general, there are two modes of operation for MDT: an immediate MDT mode of operation and a logged MDT mode of operation. In the immediate MDT mode of operation, MDT functionality involves measurements being acquired by the UE in a CONNECTED state. Thus, the immediate MDT mode of operation may require the UE to be connected to the network. For the logged MDT mode of operation, measurements are logged by the UE in IDLE mode for reporting to an eNB at a later point in time when the UE is in the CONNECTED state, as triggered by an on-demand mechanism from the eNB.

Figure 11:
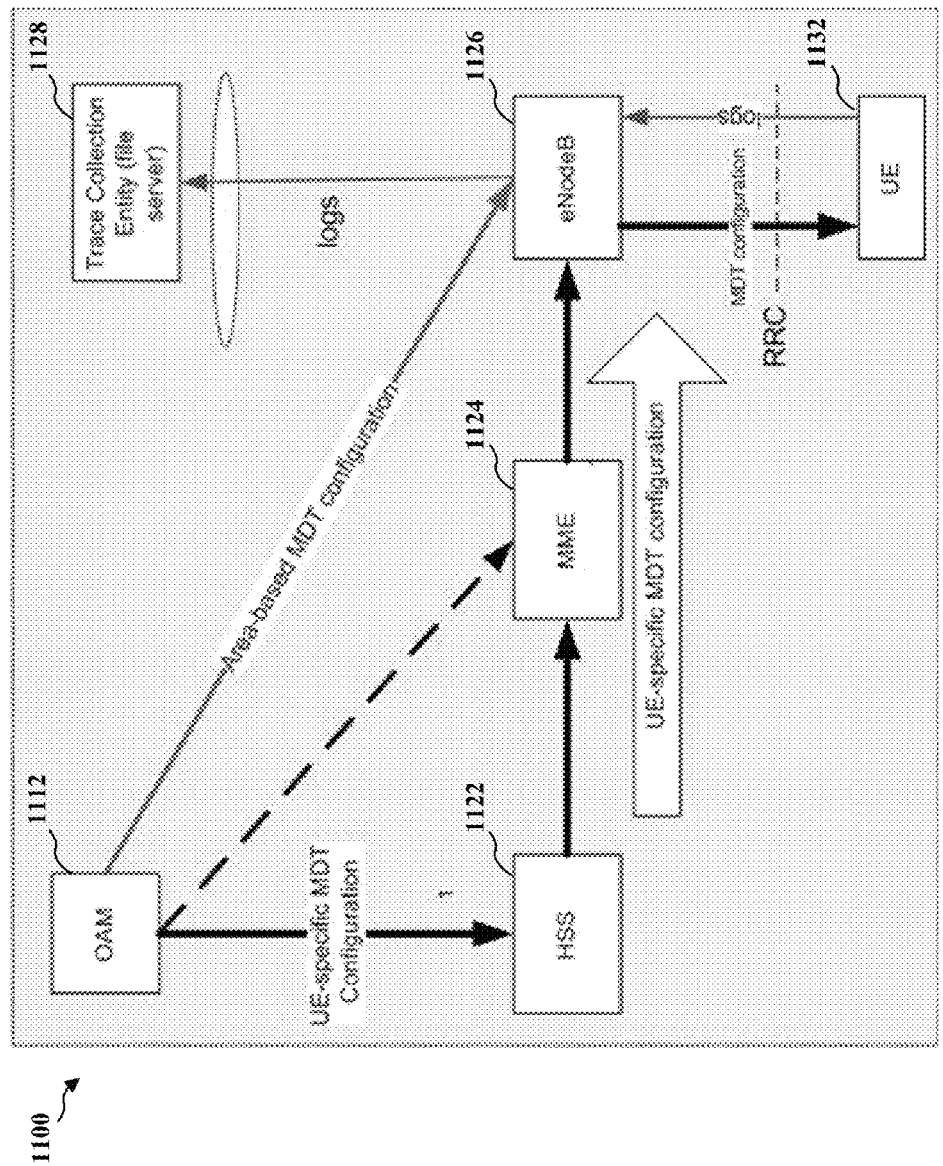
FIG. 11 is a network diagram illustrating a Minimization of Drive Tests (MDT) architecture.

FIG. 11 illustrates a MDT architecture 1100 where a MDT session is configured in a network Operations, Administration, and Maintenance (OAM) entity 1112 and propagated through the control plane to a UE 1132. An MDT session may be UE-specific or area-specific, and UE-specific configurations may be transmitted to the UE in a different manner from area-based MDT configurations.

For UE-specific configurations, the OAM entity 1112 may transmit the UE-specific MDT configuration to a Home Subscriber Server (HSS) 1122, which is a subscriber database that contains subscriber profiles and information about the subscriber's physical location. The HHS 1122 may also provide forwarding of authentication data to other network elements. The HHS 1122 may then forward the UE-specific MDT configuration to an eNB 1126 through an MME 1124. In contrast, for area-based MDT configurations, the OAM entity 1112 may transmit the area-based configuration directly to the eNB 1126.

Under either of the UE or area-specific MDT configuration scenarios, the eNB 1126 may then forward the MDT configuration to the UE 1132. In one aspect, the MDT configuration is transmitted using a protocol such as the RRC protocol that handles the control plane signaling of Layer 3 between the UE and the UTRAN. The MDT configuration may include:
  MDT session IDs,
  MDT mode {immediate, logged},
  Session duration,
  Area (e.g. MBSFN Area ID),
  Triggering events, and
  Logging interval.

Once the UE 1132 is configured, the UE 1132 will provide logs to the eNB 1126, which then forwards them to a Trace Collection Entity (TCE) 1128. The TCE 1128 may be implemented as a file server to store the logs.

Referring back to FIG. 10, at 1010, the UE determines whether it needs to report MBSFN physical layer parameters based on a recent reporting requirement.

At 1020, the UE may obtain MBSFN physical layer measurement parameters. Similar to the user-planed based approach 900, these parameters may include MBSFN RSRP, MBSFN RSRQ, and measured SNR. The MBSFN physical layer parameters that are measured may be based on PMCH subframes, and, as further described below, may vary based on the amount of correlation between the MBSFN physical layer parameter measurements and the service level reception reports. For example, the UE may be requested to obtain MBSFN measurements for PMCH subframes that include both allocated and non-allocated subframes. The UE may also be requested to obtain MBSFN measurements only for PMCH subframes that include allocated subframes.

At 1030, the new physical layer parameters are added to the current MDT report to create a modified MDT report. The modified MDT report may be controlled by the radio layer. In contrast to the user plane-based approach, security issues may not arise when the RRS or BM-SC forwards reception reports to third parties because the measurement results are sent directly to a TCE such as the TCE 1128. The physical layer measurements, however, may need to be correlated with existing service layer reception reports such that the physical layer measurement parameters and QoE metrics reported by a UE can be associated with each other.

At 1040, different options translate into different levels of correlation between the physical layer parameters and the service layer QoE metrics. Level of correlation is an indication of how physical layer measurement parameters and QoE metrics are associated with each other. In summary, no correlation 1040a occurs when a UE monitors both allocated and not allocated PMCH subframes where allocated PMCH subframes stand for those subframes carrying MBMS services/sessions which are of interest to the UE, and the UE may or may not send service layer reports. Even if UE does send service layer report, the network may lack the knowledge in associating the physical layer measurements with the service layer report. Limited correlation 1040b occurs when a UE monitors only allocated PMCH subframes for MBMS services/sessions which are of interest to the UE, and the UE may or may not send service layer reports. Similarly, even if UE does send service layer report, the network may lack the knowledge in associating the physical layer measurements with the service layer report. Full correlation 1040c results when a UE monitors only allocated PMCH subframes for MBMS services/sessions which are of interest to the UE, and the UE sends service layer reports and the network has the knowledge in associating physical layer measurements and the QoE metrics in the service layer.

No correlation 1040a results when a UE is configured to monitor both allocated and not allocated PMCH subframes for MBMS services which are of interest to the UE, and the UE may or may not send service layer reports. Correlation operations may not be performed because specific UEs are configured by the MDT configuration to log MBSFN data. For this approach, the UEs may have to be MBMS capable. In Release 11 of LTE, an eNB may acquire knowledge of whether a UE supports MBMS through the use of an MBMSInterestIndication message, or the network may have such knowledge through configuration information. As noted above, in cases of no correlation, all specified reporting UEs may acquire MBSFN measurements for PMCH subframes, which may include both allocated and not allocated subframes. In this approach, the MDT configuration may need to specify an MBSFN Area ID to identify the particular MBSFN areas for which physical layer measurements are to be made. A UE may be configured to monitor multiple MBSFN areas even though the UE may not be interested in all the MBMS services provided by all of these MBSFN areas. Once the physical layer measurements are made, the UE may follow MDT procedures for reporting MBSFN measurements. Service layer reports may not be sent by the UE, in which case there are no QoE metrics to associate with the MBSFN measurements and there is no correlation. Even if a UE does happen to send service layer reports, the network would not be aware of which UE sent the service layer reports. Therefore the network cannot associate QoE metrics with the MBSFN measurements. As such, there is no correlation.

Limited correlation 1040b results when a UE is configured to only monitor PMCH subframes allocated for MBMS services which are of interest to the UE, and the UE may or may not be configured to report QoE metrics by service layer reports. For example, specific UEs may be configured by MDT configuration to log MBSFN information. In this approach, the UE should be MBMS capable and the network should be aware of the services of interest to the UE. Similar to no correlation 1040a, in limited correlation an eNB may have knowledge of whether the UE supports MBMS with the MBMSInterestIndication message or the network could have such knowledge through configuration information. As noted above, in limited correlation 1040b, all specified reporting UEs only take the MBSFN measurements for PMCH subframes, which include allocated subframes.

These measurements are based on a subset or all MBSFN subframes allocated for the session of interest to the UE when listening to MBMS services. The MBSFN physical layer measurements may also follow the received MDT configuration. The rest of the UEs may follow the current rules of MDT for reporting MBSFN measurements. UEs may also report QoE metrics to the Reception Report Server by bypassing selection rules as defined in existing service layer.

Full correlation 1040c, results when a UE is configured to measure PMCH subframes allocated for MBMS services which are of interest to the UE, and the UE is configured to report QoE metrics by service layer reports. In this approach, implementing a UE-specific MBMS MDT session establishment and reporting mechanism may be necessary. One option may be for an entity such as the BM-SC to identify the UEs that are to report to the MME/eNB during the start and end of the session, where the UEs are specified based on each UE's MBMS service registration. As another option, the OAM may indicate to the MME/eNB on session start and end based on pre-configuration and MDT configuration for MBMS is broadcast to the UEs over SIB or MCCH. Further, an MBMS MDT session may be selected as being different from a unicast MDT session, or an MDT session may be used for both MBMS and unicast. In one aspect, measurements are reported by UEs on demand from the RAN, based on MBMS session duration.

Further, in full correlation 1040c, an MBMS MDT session may be correlated with an existing QoE metric report. The network may correlate reporting UEs by tracking the random seeds used by the UE to implement a random sampling approach (e.g., as specified by 3GPP TS 26.346). In this approach, UEs may need to implement the same rules for selecting the reporting UE and triggering physical layer reporting. As one option for implementing the same rules, MDT session configuration may be required for all MBMS-capable UEs either through unicast or broadcast. After the UE follows the rule specified by the service layer, the UE will indicate availability of the UE for performing measurements to the RAN. The RAN may be used to request a measurement report from the UE. In another option, a default configuration is pre-configured in the UE. The UE follows the rule specified by the service layer to decide if the measurement is to be performed, and the UE may send the measurement report to the RAN and service layer if the UE has logged any measurements. This option is similar to the option of using different reporting addresses for reporting operator sensitive parameters. In another option, the UE may receive a threshold from the network for one or more MBSFN physical layer parameters for triggering when the UE may need to provide a report. The UE may autonomously report MBSFN measurements when any of the MBSFN RSRP/RSRP/SNR parameters exceed a corresponding specified threshold. If the parameters do not exceed the threshold then the UE does not report any MBSFN measurements.

In one aspect of the disclosed approach, post processing may be performed for correlation between measurements, i.e., QoE metrics and MBSFN physical layer related parameters. In one approach, either the eNB or the MCE may forward such measurements to an entity such as the RRS or BM-SC. The entity may then correlate the measurements of the physical and service layers. In another approach, the MDT and an entity such as the RRS or the BM-SC may both forward reports to another network entity. For example, reports may be forwarded to the TCE, and this third network entity may correlate parameters in the physical layer reports with metrics in service layer reports by using such information as time stamps and device/client IDs.

In the current MDT framework, the network identifies the specific UEs that need to report. The report is sent to a Trace Collection Entity (TCE) that is defined by the 3GPP standards organization. Therefore, in aspect of the disclosed approach, MBSFN physical layer measurement parameters and other operator sensitive parameters may be modified so that they are reported to a network entity that is under control by the operator while allowing the reporting of other existing QoE metrics to a third party if the new MBSFN physical measurement parameters are added to the MDT.

Although specific UEs may be specified to report MBSFN physical layer measurements, the network entity (e.g., the OAM entity) that configures the specific UEs to report may not be aware of the MBMS capability of the UE. Therefore, the specified UEs may not be able to log MBSFN data if the UEs do not support MBMS. Furthermore, since the network is not aware of the MBMS services in which the UE is interested, all specified reporting UEs that are capable of receiving MBMS will make the MBSFN measurements for PMCH subframes that include both allocated and non-allocated subframes. The MDT configuration may also need to specify an MBSFN Area ID for the MBSFN measurements, which means that a UE may be asked to monitor multiple MBSFN areas even though the UE may not be interested in all MBMS services offered in all of these MBSFN areas. This may add additional complexity to the implementation of an UE.

In general, a service-layer based approach may be preferred because the implementations for both the UE and network are simpler. Also, the UE may only need to monitor the MBSFN subframes that are allocated for the MBMS services of interest to the UE. Further, simple changes may be overlaid on top of the existing service layer based approach to implement one or more of the various approaches described herein. If correlation between MBSFN physical layer measurements and existing QoE metrics is not required, the MDT-based solution may be implemented without substantial implementation complexity. In other words, the MDT may just configure the UE to monitor a set of PMCH subframes and report such measurements. However, additional implementation complexity for the UE may result even if no correlation is required if the UE is asked to monitor MBSFN subframes and/or MBSFN areas that are not of interest to the UE.

Figure 12:
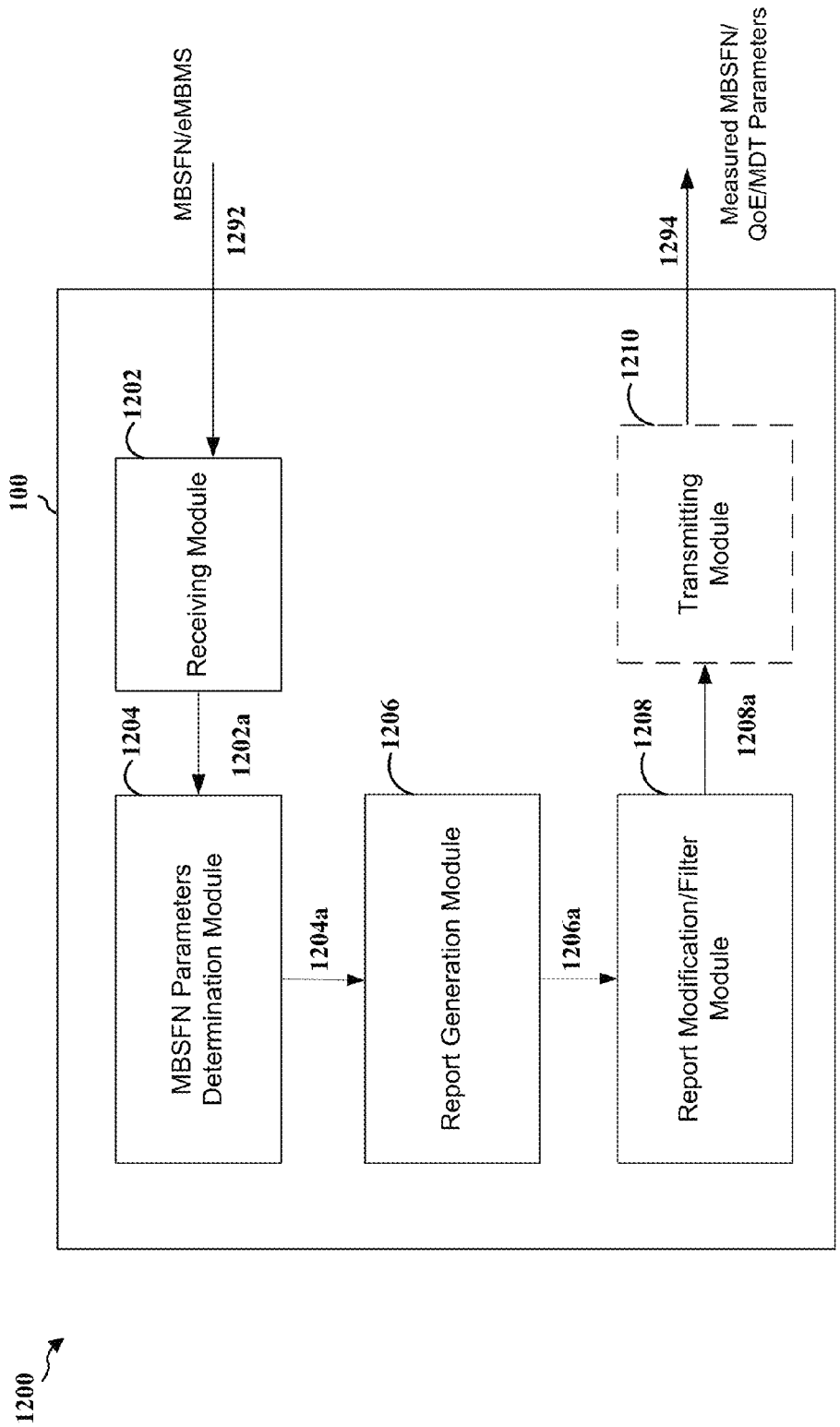
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 100. The apparatus 100 includes a receiving module 1202 that receives a reporting requirement for one or more MBSFN physical layer parameters as well as eMBMS data and control signals 1292. The apparatus 100 also includes a MBSFN parameters determination module 1204 that obtains the one or more MBSFN physical layer parameters from a processed set of eMBMS data and control signals 1202a from the receiving module 1202. Measured parameters 1204a are provided to a report generation module 1206 that creates a report 1206a based on the obtained one or more MBSFN physical layer parameters. The report 1206a is provided to a report modification/filter module 1208 that filters the report 1206a to separate sensitive information and may provide filtered information 1208a as well as other information from the report 1206a to be transmitted by a transmitting module 1210 in a transmitted signal 1294 that includes the measured MBSFN physical layer/QoE/MDT parameters. As discussed above, the various parameters may be transmitted to various entities. For example, the MBSFN parameters may be transmitted to an RRC while the MDT parameters may be transmitted to the TCE.

The apparatus may include additional modules that perform each of the steps of the algorithm in the aforementioned flow charts. As such, each step in the aforementioned flow charts may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
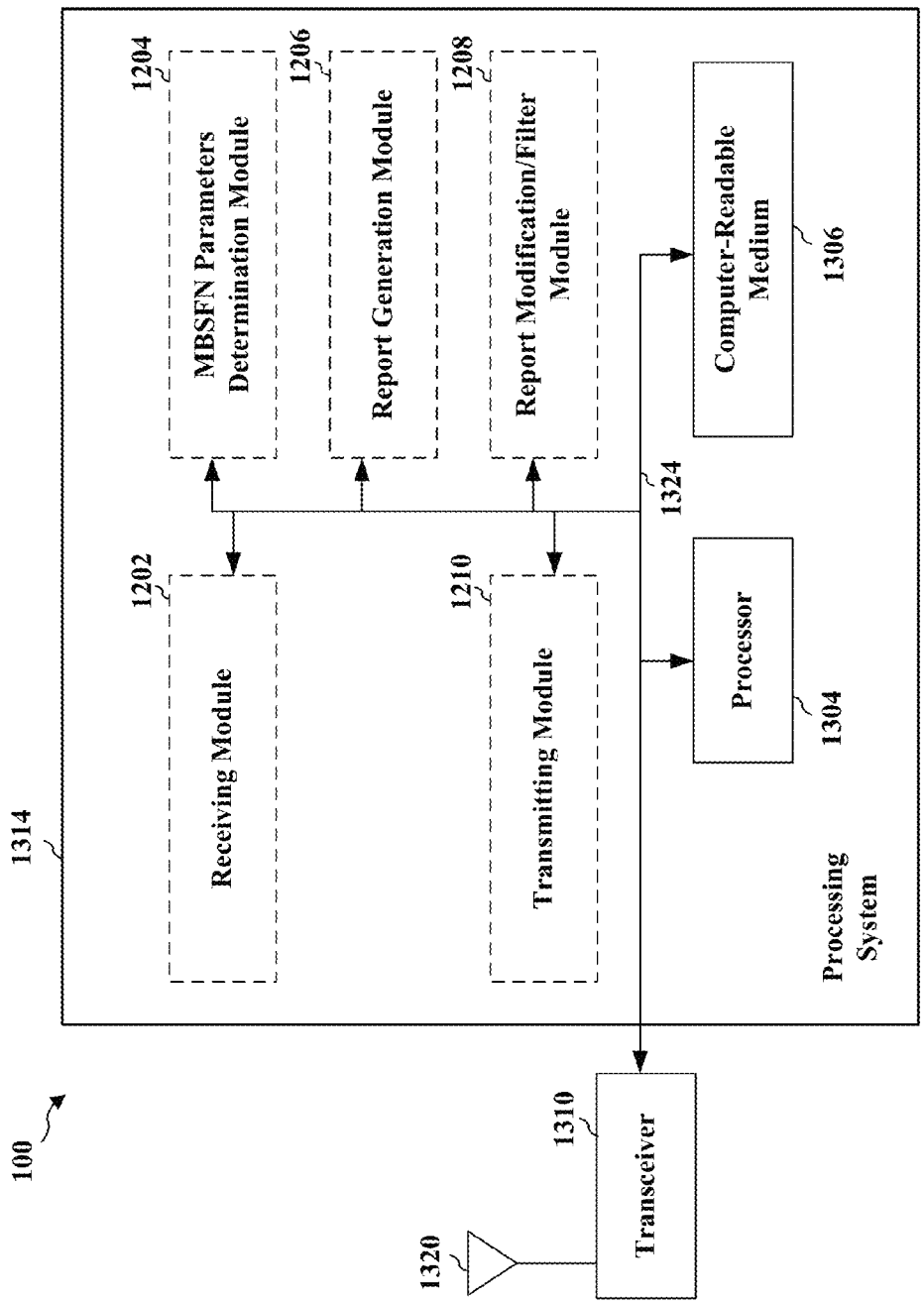
FIG. 13 is a diagram illustrating an example of a hardware implementation for an apparatus employing a processing system.

FIG. 13 is a diagram illustrating an example of a hardware implementation for an apparatus 100 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1202, 1204, 1206, 1208, and 1210, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes modules 1202, 1204, 1206, 1208, and 1210. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 100 for wireless communication includes means for receiving a reporting requirement for one or more MBSFN physical layer parameters. In addition, the apparatus includes means for obtaining the one or more MBSFN physical layer parameters. Furthermore, the apparatus further includes means for creating a report based on the obtained one or more MBSFN physical layer parameters. The apparatus may further include means for filtering the report to separate sensitive information. The aforementioned means may be one or more of the aforementioned modules of the apparatus 100 and/or the processing system 1314 of the apparatus 100 configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is to be understood that various aspects of the disclosed approaches may be applied to both MBMS over UMTS and eMBMS over LTE. Also, various aspects of the approaches disclosed herein also may be applied to 3GPP2 BCMCS. Thus, there should be no limitations on the applicability of the various aspects of the disclosed approaches to any multimedia broadcast system.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a reporting requirement for one or more multicast-broadcast single frequency network (MBSFN) physical layer parameters, including at least one parameter corresponding to a MBSFN reference signal;
   obtaining the one or more MBSFN physical layer parameters; and
   creating a report based on the obtained one or more MBSFN physical layer parameters by including the one or more MBSFN physical layer parameters in a minimization of drive test (MDT) report,
   wherein the parameter corresponding to the MBSFN reference signal comprises one of a MBSFN reference signal strength indicator (RSSI), a MBSFN reference signal received power (RSRP) or a MBSFN reference signal received quality (RSRQ).

2. The method of claim 1, wherein obtaining the one or more MBSFN physical layer parameters comprises measuring one or more physical multicast channel (PMCH) subframes.

3. The method of claim 2, wherein the one or more PMCH subframes correspond to monitored PMCH subframes as schedule by MCCH/MCH scheduling information.

4. The method of claim 2, wherein the one or more PMCH subframes correspond to a subset of allocated PMCH subframes having guaranteed MBSFN transmission.

5. The method of claim 1, wherein the report comprises quality of experience (QoE) parameters in addition to the one or more MBSFN physical layer parameters, and further comprising filtering the report to separate sensitive information.

6. The method of claim 5, wherein filtering the report comprises forwarding the report to a reception report server entity.

7. The method of claim 6, wherein reception report server entity comprises a broadcast multicast service center (BM-SC) entity.

8. The method of claim 5, wherein filtering the report comprises separating the one or more MBSFN physical layer parameters from the QoE parameters.

9. The method of claim 1, wherein the report comprises quality of experience (QoE) parameters in addition to the one or more MBSFN physical layer parameters, and further comprising correlating the QoE parameters with the one or more MBSFN physical layer parameters.

10. The method of claim 9, wherein correlating the QoE parameters with the one or more MBSFN physical layer parameters comprises receiving a UE-specific indication to correlate the QoE parameters with the one or more MBSFN physical layer parameters.

11. The method of claim 9, wherein correlating the QoE parameters with the one or more MBSFN physical layer parameters comprises receiving a broadcast indication to correlate the QoE parameters with the one or more MBSFN physical layer parameters.

12. The method of claim 1, wherein receiving the reporting requirement comprises one or more of: receiving a notification during a service announcement and discovery process, receiving a notification during a service registration process, receiving a notification during a multicast broadcast multimedia service (MBMS) session establishment process, and receiving a notification from an open mobile alliance device management (OMA-DM) message.

13. An apparatus for wireless communication, comprising:
  means for receiving a reporting requirement for one or more multicast-broadcast single frequency network (MBSFN) physical layer parameters, including at least one parameter corresponding to a MBSFN reference signal;
  means for obtaining the one or more MBSFN physical layer parameters; and
  means for creating a report based on the obtained one or more MBSFN physical layer parameters by including the one or more MBSFN physical layer parameters in a minimization of drive test (MDT) report,
  wherein the parameter corresponding to the MBSFN reference signal comprises one of a MBSFN reference signal strength indicator (RSSI), a MBSFN reference signal received power (RSRP) or a MBSFN reference signal received quality (RSRQ).

14. The apparatus of claim 13, wherein the means for obtaining the one or more MBSFN physical layer parameters is configured to measure one or more physical multicast channel (PMCH) subframes.

15. The apparatus of claim 14, wherein the one or more PMCH subframes correspond to monitored PMCH subframes as schedule by MCCH/MCH scheduling information.

16. The apparatus of claim 14, wherein the one or more PMCH subframes correspond to a subset of allocated PMCH subframes having guaranteed MBSFN transmission.

17. The apparatus of claim 13, wherein the report comprises quality of experience (QoE) parameters in addition to the one or more MBSFN physical layer parameters, and further comprising means for filtering the report to separate sensitive information.

18. The apparatus of claim 17, wherein the means for filtering the report is configured to forward the report to a reception report server entity.

19. The apparatus of claim 18, wherein reception report server entity comprises a broadcast multicast service center (BM-SC) entity.

20. The apparatus of claim 17, wherein the means for filtering the report is configured to separate the one or more MBSFN physical layer parameters from the QoE parameters.

21. The apparatus of claim 13, wherein the report comprises quality of experience (QoE) parameters in addition to the one or more MBSFN physical layer parameters, and further comprising means for correlating the QoE parameters with the one or more MBSFN physical layer parameters.

22. The apparatus of claim 21, wherein the means for correlating the QoE parameters with the one or more MBSFN physical layer parameters is configured to receive a UE-specific indication to correlate the QoE parameters with the one or more MBSFN physical layer parameters.

23. The apparatus of claim 21, wherein the means for correlating the QoE parameters with the one or more MBSFN physical layer parameters is configured to receive a broadcast indication to correlate the QoE parameters with the one or more MBSFN physical layer parameters.

24. The apparatus of claim 13, wherein the means for receiving the reporting requirement is configured to do one or more of: receive a notification during a service announcement and discovery process, receive a notification during a service registration process, receive a notification during a multicast broadcast multimedia service (MBMS) session establishment process, and receive a notification from an open mobile alliance device management (OMA-DM) message.

25. An apparatus for wireless communication, comprising:
  a memory; and
  at least one processor coupled to the memory and configured to:
    receive a reporting requirement for one or more multicast-broadcast single frequency network (MBSFN) physical layer parameters, including at least one parameter corresponding to a MBSFN reference signal;
    obtain the one or more MBSFN physical layer parameters; and
    create a report based on the obtained one or more MBSFN physical layer parameters by including the one or more MBSFN physical layer parameters in a minimization of drive test (MDT) report,
  wherein the parameter corresponding to the MBSFN reference signal comprises one of a MBSFN reference signal strength indicator (RSSI), a MBSFN reference signal received power (RSRP) or a MBSFN reference signal received quality (RSRQ).

26. The apparatus of claim 25, wherein to obtain the one or more MBSFN physical layer parameters the processing system is configured to measure one or more physical multicast channel (PMCH) subframes.

27. The apparatus of claim 26, wherein the one or more PMCH subframes correspond to monitored PMCH subframes as schedule by MCCH/MCH scheduling information.

28. The apparatus of claim 26, wherein the one or more PMCH subframes correspond to a subset of allocated PMCH subframes having guaranteed MBSFN transmission.

29. The apparatus of claim 25, wherein the report comprises quality of experience (QoE) parameters in addition to the one or more MBSFN physical layer parameters, and the processing system is further configured to filter the report to separate sensitive information.

30. The apparatus of claim 29, wherein the processor is further configured to forward the report to a reception report server entity.

31. The apparatus of claim 30, wherein reception report server entity comprises a broadcast multicast service center (BM-SC) entity.

32. The apparatus of claim 29, wherein the processor is further configured to separate the one or more MBSFN physical layer parameters from the QoE parameters.

33. The apparatus of claim 25, wherein the report comprises quality of experience (QoE) parameters in addition to the one or more MBSFN physical layer parameters, and the processing system is further configured to correlate the QoE parameters with the one or more MBSFN physical layer parameters.

34. The apparatus of claim 33, wherein to correlate the QoE parameters with the one or more MBSFN physical layer parameters the processing system is configured to receive a UE-specific indication to correlate the QoE parameters with the one or more MBSFN physical layer parameters.

35. The apparatus of claim 33, wherein to correlate the QoE parameters with the one or more MBSFN physical layer parameters the processing system is configured to receive a broadcast indication to correlate the QoE parameters with the one or more MBSFN physical layer parameters.

36. The apparatus of claim 25, wherein to receive the reporting requirement the processing system is configured to do one or more of: receive a notification during a service announcement and discovery process, receive a notification during a service registration process, receive a notification during a multicast broadcast multimedia service (MBMS) session establishment process, and receive a notification from an open mobile alliance device management (OMA-DM) message.

37. A non-transitory computer-readable medium storing computer executable code for wireless communication, comprising code for:
receiving a reporting requirement for one or more multicast-broadcast single frequency network (MBSFN) physical layer parameters, including at least one parameter corresponding to a MBSFN reference signal;
obtaining the one or more MBSFN physical layer parameters; and
creating a report based on the obtained one or more MBSFN physical layer parameters by including the one or more MBSFN physical layer parameters in a minimization of drive test (MDT) report,
wherein the parameter corresponding to the MBSFN reference signal comprises one of a MBSFN reference signal strength indicator (RSSI), a MBSFN reference signal received power (RSRP) or a MBSFN reference signal received quality (RSRQ).

38. The non-transitory computer-readable medium of claim 37, wherein code for obtaining the one or more MBSFN physical layer parameters comprises code for measuring one or more physical multicast channel (PMCH) subframes.

39. The non-transitory computer-readable medium of claim 38, wherein the one or more PMCH subframes correspond to monitored PMCH subframes as schedule by MCCH/MCH scheduling information.

40. The non-transitory computer-readable medium of claim 38, wherein the one or more PMCH subframes correspond to a subset of allocated PMCH subframes having guaranteed MBSFN transmission.

41. The non-transitory computer-readable medium of claim 37, wherein the report comprises quality of experience (QoE) parameters in addition to the one or more MBSFN physical layer parameters, and further comprising code for filtering the report to separate sensitive information.

42. The non-transitory computer-readable medium of claim 41, wherein the code for filtering the report comprises code for forwarding the report to a reception report server entity in order to filter the report.

43. The non-transitory computer-readable medium of claim 42, wherein reception report server entity comprises a broadcast multicast service center (BM-SC) entity.

44. The non-transitory computer-readable medium of claim 41, wherein the code for filtering the report comprises code for separating the one or more MBSFN physical layer parameters from the QoE parameters.

45. The non-transitory computer-readable medium of claim 37, wherein the report comprises quality of experience (QoE) parameters in addition to the one or more MBSFN physical layer parameters, and further comprising code for correlating the QoE parameters with the one or more MBSFN physical layer parameters.

46. The non-transitory computer-readable medium of claim 45, wherein the code for correlating the QoE parameters with the one or more MBSFN physical layer parameters comprises code for receiving a UE-specific indication to correlate the QoE parameters with the one or more MBSFN physical layer parameters.

47. The non-transitory computer-readable medium of claim 45, wherein the code for correlating the QoE parameters with the one or more MBSFN physical layer parameters comprises code for receiving a broadcast indication to correlate the QoE parameters with the one or more MBSFN physical layer parameters.

48. The non-transitory computer-readable medium of claim 37, wherein the code for receiving the reporting requirement comprises code for one or more of: receiving a notification during a service announcement and discovery process, receiving a notification during a service registration process, receiving a notification during a multicast broadcast multimedia service (MBMS) session establishment process, and receiving a notification from an open mobile alliance device management (OMA-DM) message.

\* \* \* \* \*